R. S. C. FOW.
SLICING MACHINE.
APPLICATION FILED MAR. 19, 1919.
1,328,916.  Patented Jan. 27, 1920.
12 SHEETS—SHEET 1.
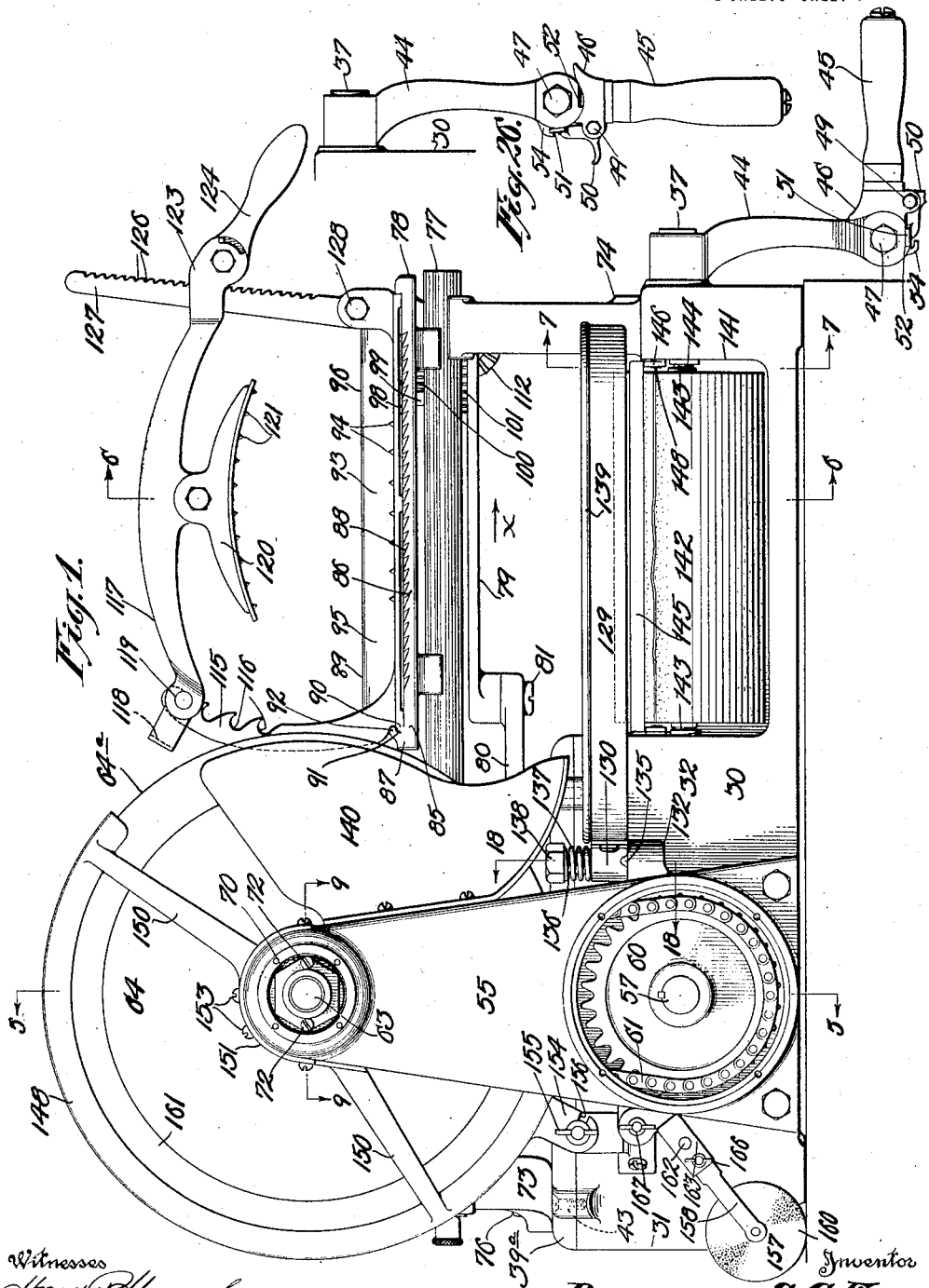

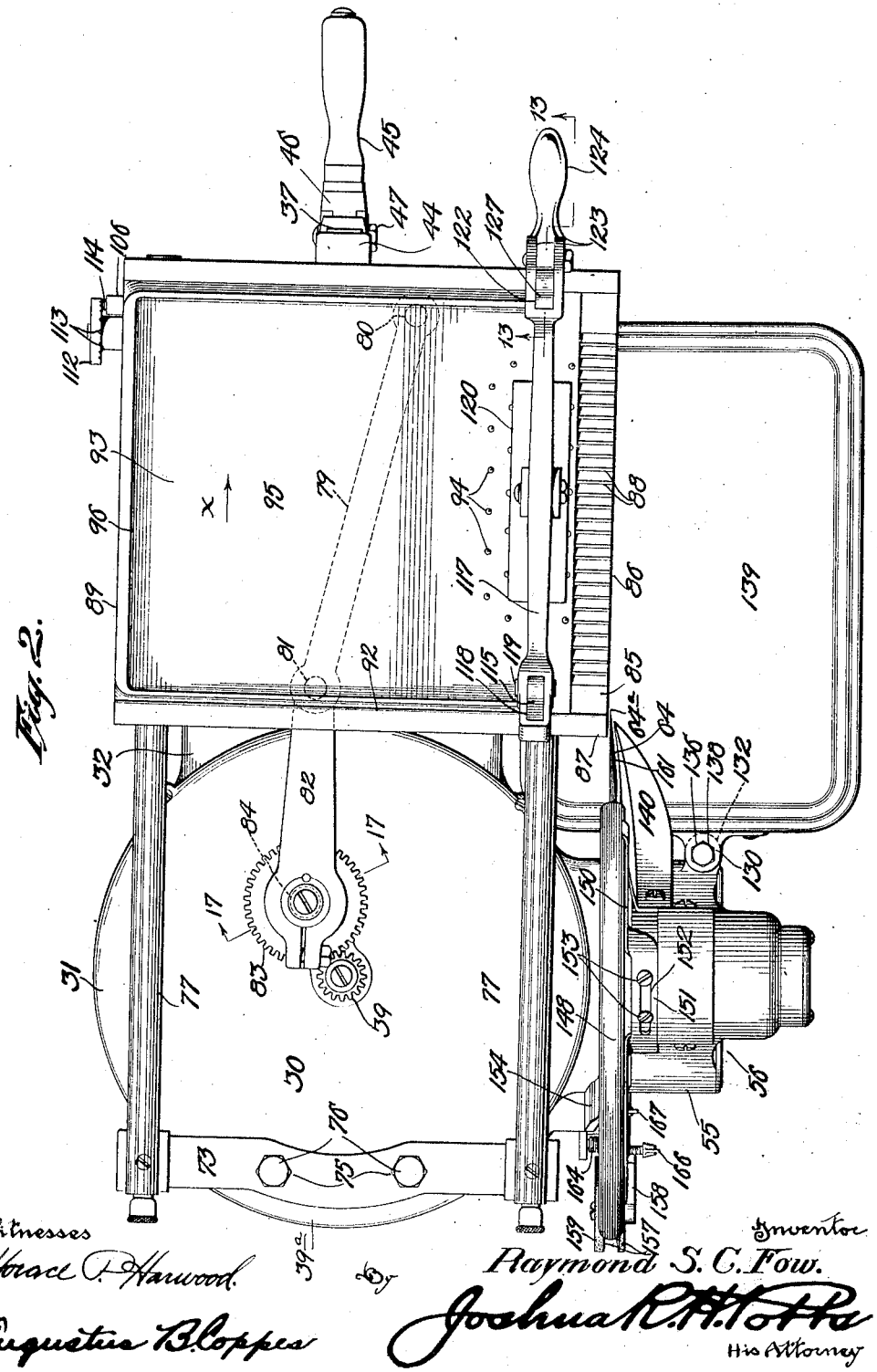

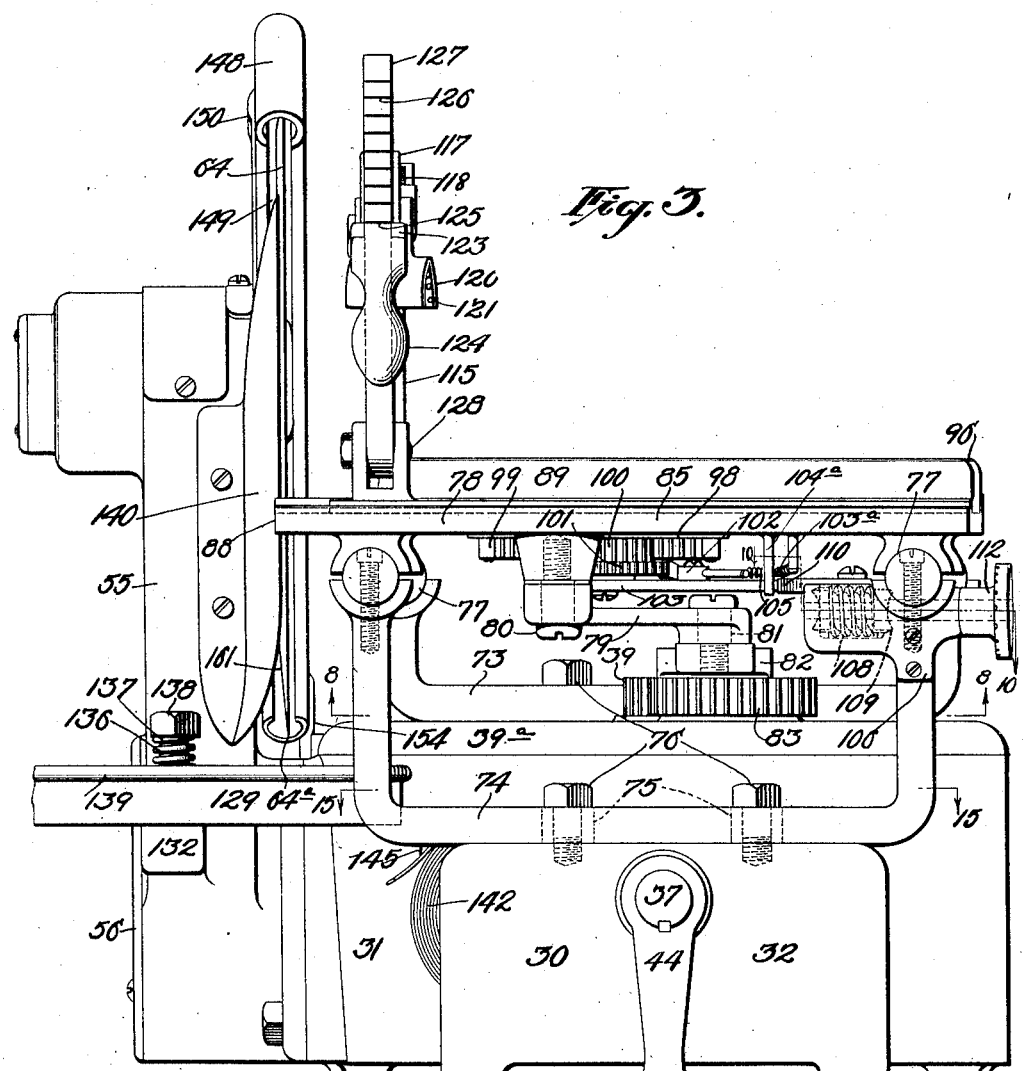
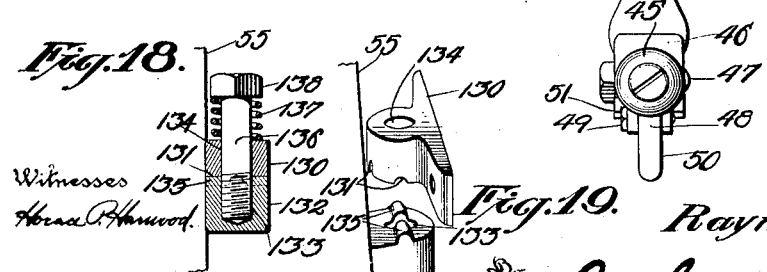

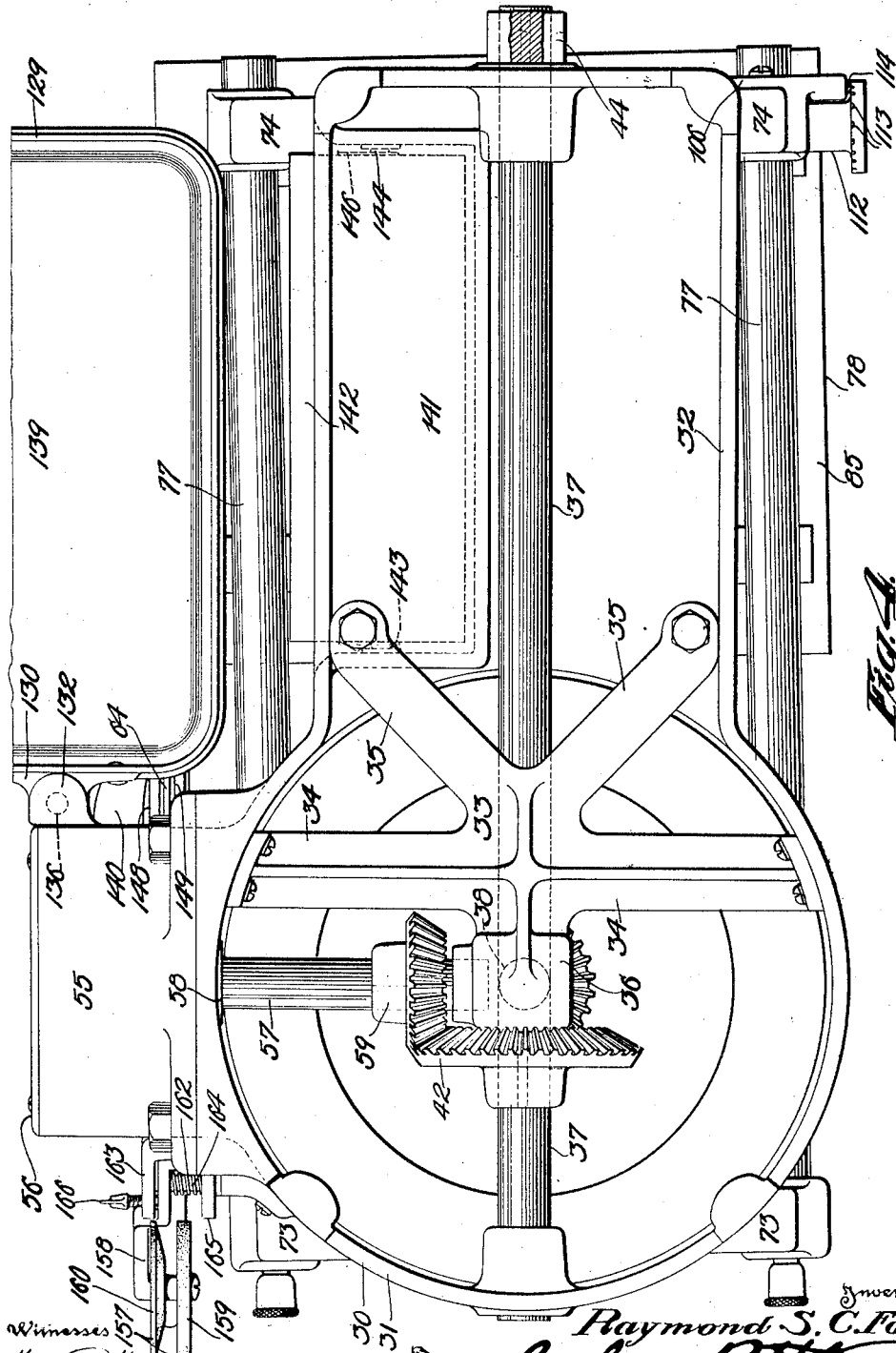

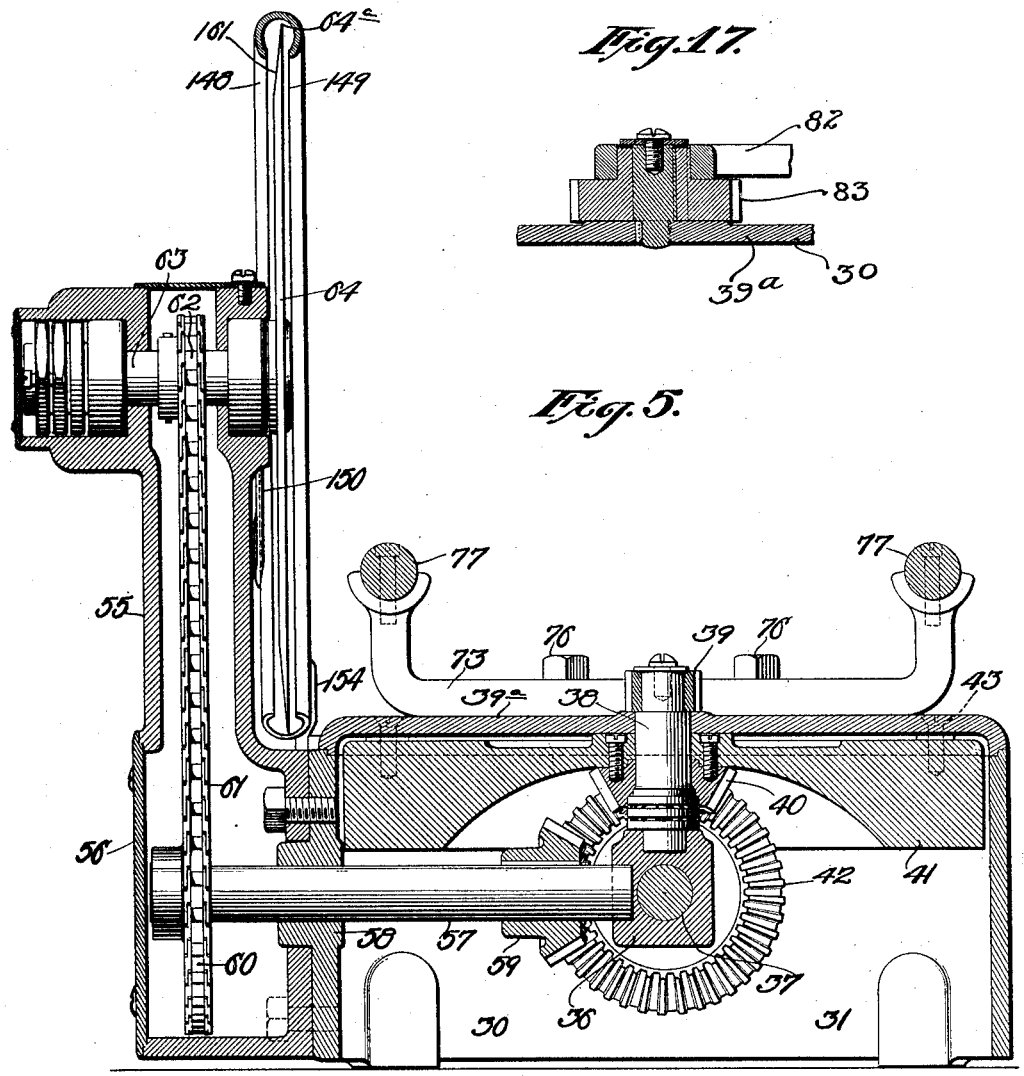

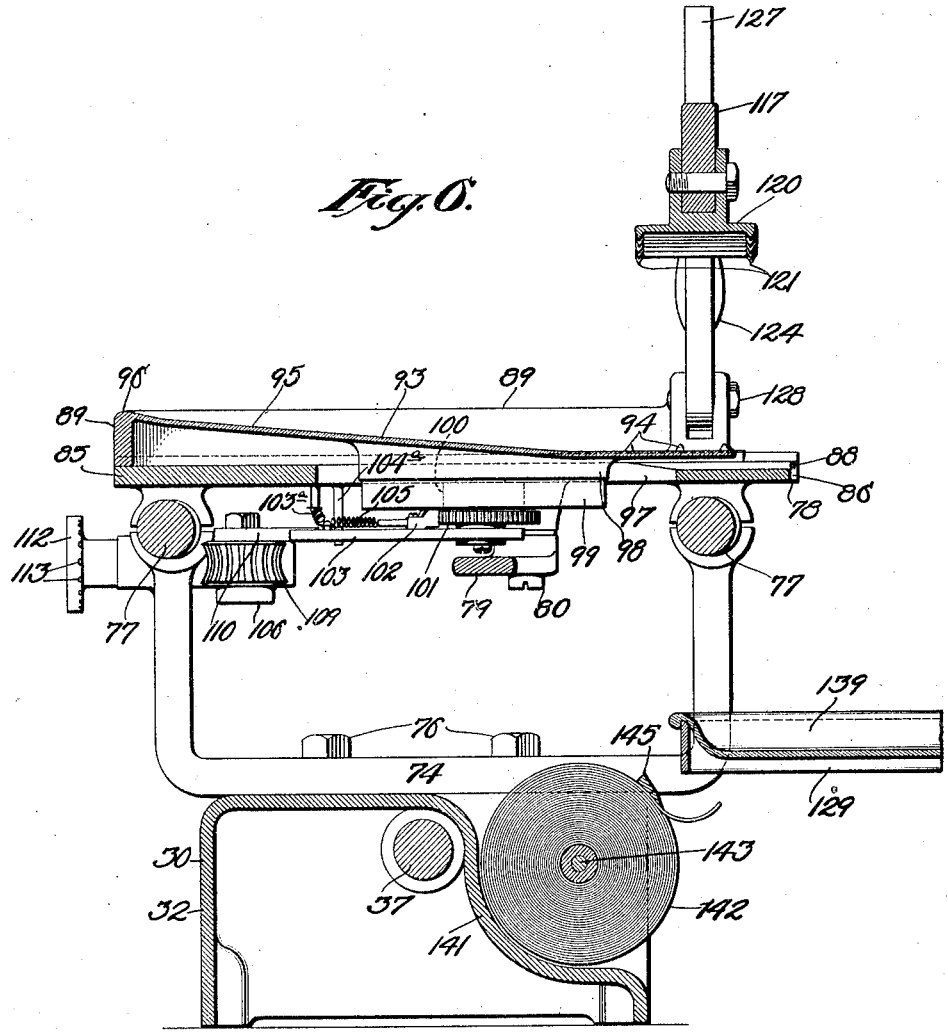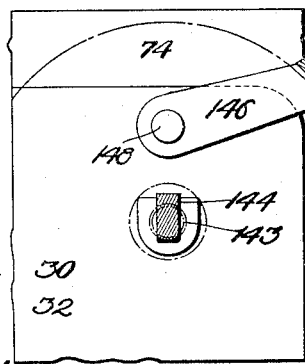

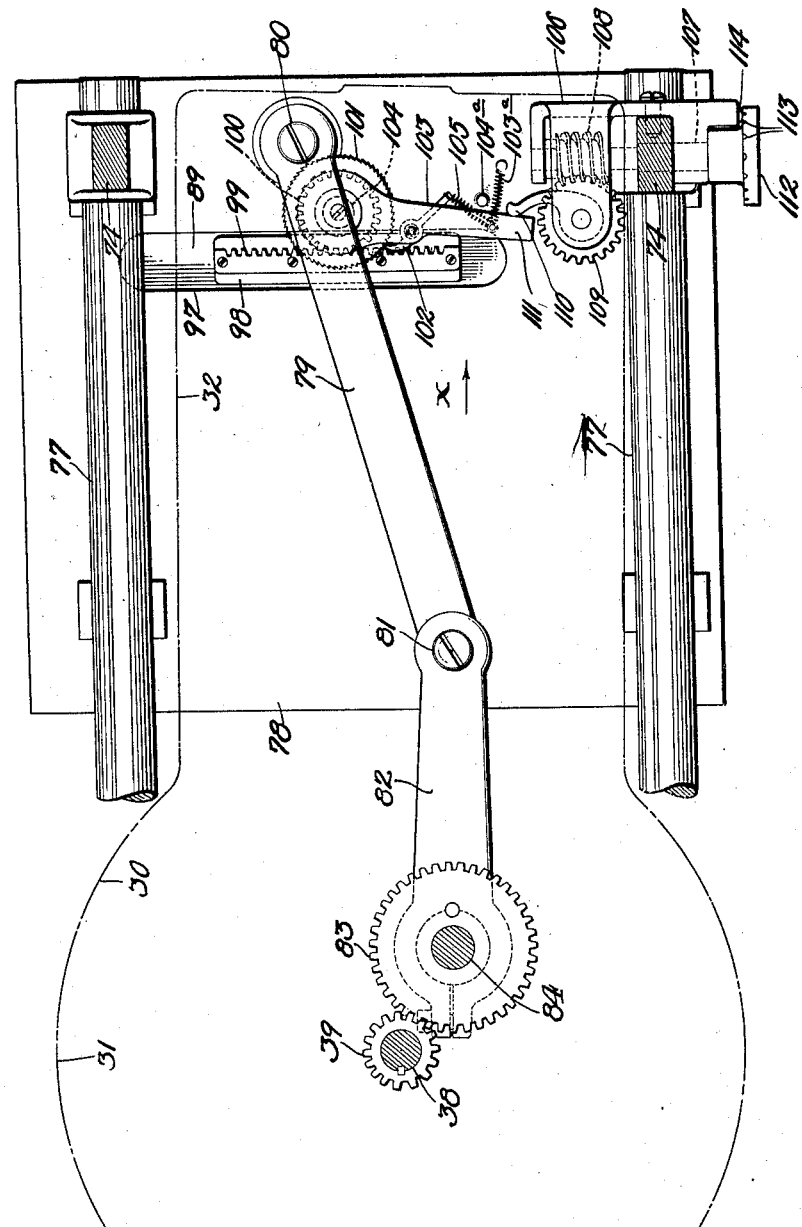

R. S. C. FOW.
SLICING MACHINE.
APPLICATION FILED MAR. 19, 1919.

1,328,916.

Patented Jan. 27, 1920.
12 SHEETS—SHEET 8.

Witnesses
Horace P. Harwood.
Augustus B. Copper

Inventor
Raymond S. C. Fow.
By Joshua R. H. Potts
His Attorney

R. S. C. FOW.
SLICING MACHINE.
APPLICATION FILED MAR. 19, 1919.

1,328,916.

Patented Jan. 27, 1920.
12 SHEETS—SHEET 9.

Witnesses
Horace P. Harwood
Augustus B. Appius

Inventor
Raymond S. C. Fow.
By Joshua R. H. Potts
His Attorney

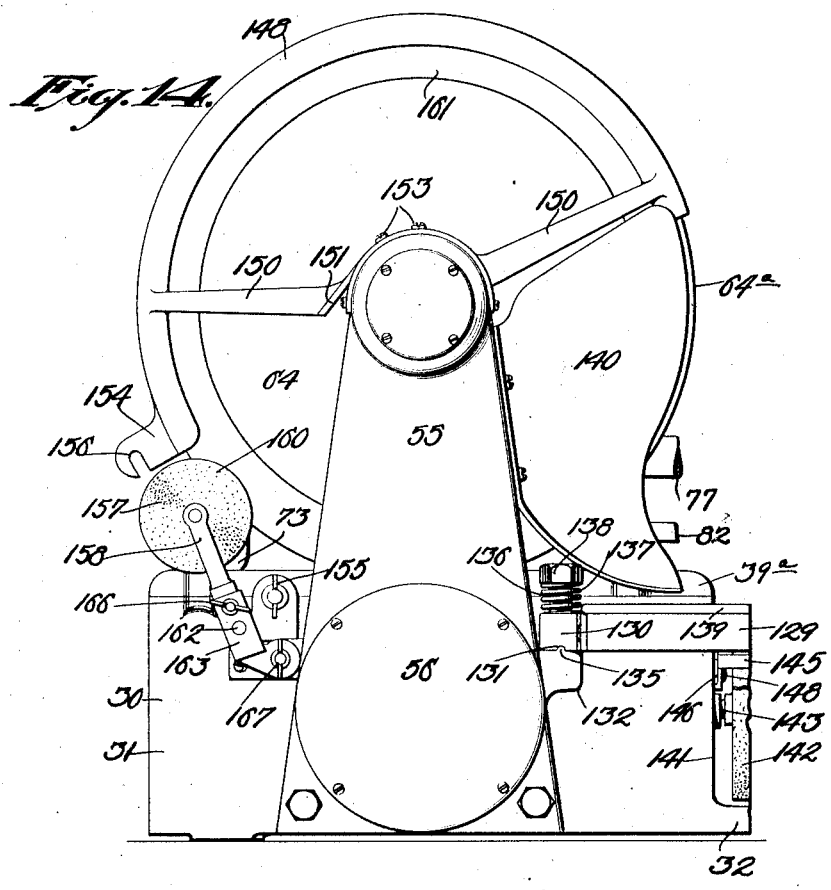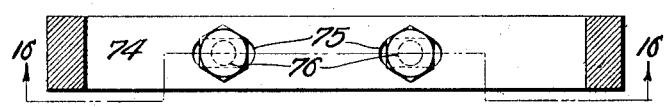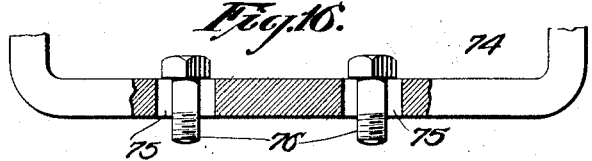

R. S. C. FOW.
SLICING MACHINE.
APPLICATION FILED MAR. 19, 1919.

1,328,916.

Patented Jan. 27, 1920.
12 SHEETS—SHEET 11.

R. S. C. FOW.
SLICING MACHINE.
APPLICATION FILED MAR. 19, 1919.
1,328,916.
Patented Jan. 27, 1920.
12 SHEETS—SHEET 12.
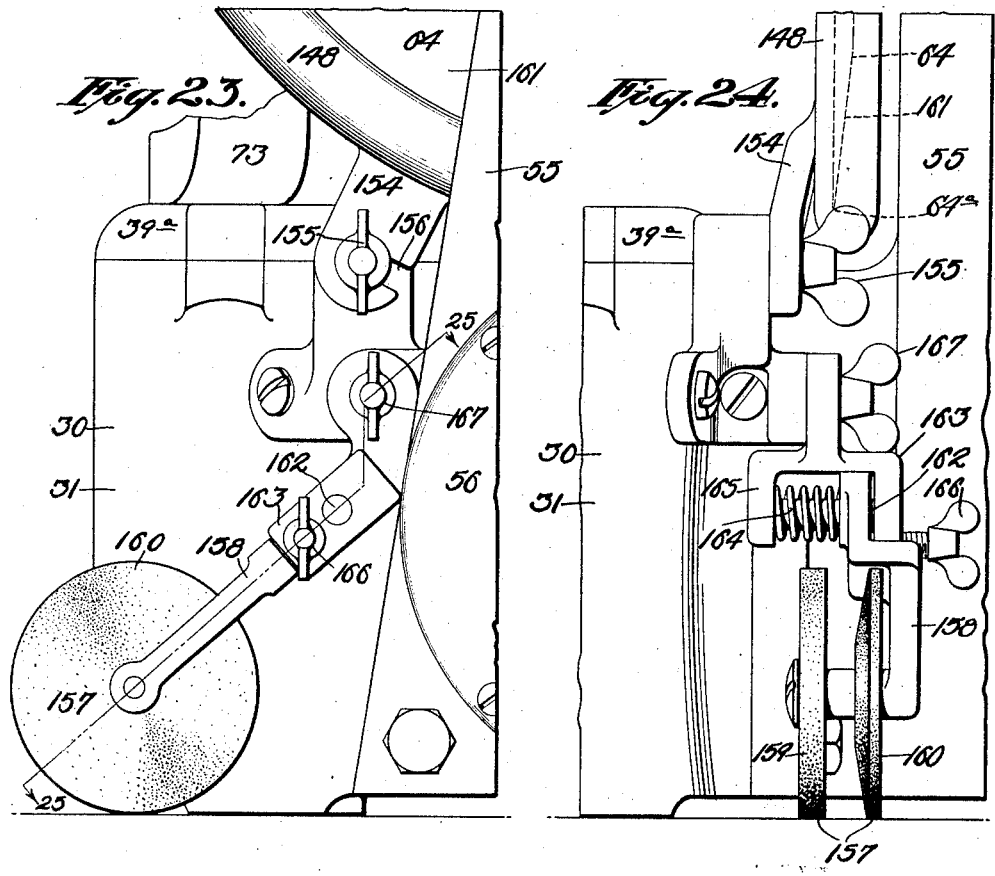
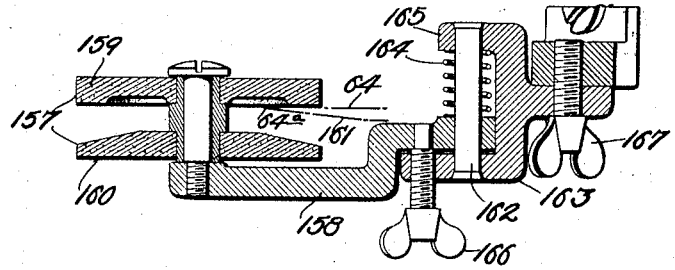

UNITED STATES PATENT OFFICE.

RAYMOND S. C. FOW, OF PHILADELPHIA, PENNSYLVANIA, ASSIGNOR OF SEVENTY-NINE ONE-HUNDREDTHS TO ROLLAND T. FRUSH AND TWENTY-ONE ONE-HUNDREDTHS TO WILLIAM THOMPSON, BOTH OF PHILADELPHIA, PENNSYLVANIA.

SLICING-MACHINE.

1,328,916.  Specification of Letters Patent.  Patented Jan. 27, 1920.

Application filed March 19, 1919. Serial No. 283,498.

*To all whom it may concern:*

Be it known that I, RAYMOND S. C. FOW, a citizen of the United States, residing at Philadelphia, in the county of Philadelphia and State of Pennsylvania, have invented certain new and useful Improvements in Slicing-Machines, of which the following is a specification.

One object of my invention is to provide an improved machine, for slicing meat or the like, which will be of a durable and simple construction and which has features rendering it convenient for use in stores where it is necessary to quickly slice meat for customers.

Another object is to so construct my improved slicing machine that it can be easily operated to cut slices of various thicknesses.

A further object is to provide my improved machine with means for receiving the sliced material, said means being operative to be swung into a position to permit the inspection of the material by a customer.

A further object is to so construct my improved machine that it will firmly hold the meat or other material to be sliced and convey it in such manner to the cutting knife that the cutting can be done easily and without damaging strain to the parts of the machine.

Another object is to provide my improved machine with a knife guard which can be quickly swung into a position to permit the sharpening of the knife, said guard, during the sharpening action serving to prevent the flying of particles over the machine and into the face of the person who is operating the machine.

A still further object is to provide the machine of my invention with an improved driving means and improved supporting structure therefor.

Another object is to so make the parts of my improved machine that they can be quickly made and assembled.

These objects, and other advantageous ends which will be described hereinafter, I attain in the following manner, reference being had to the accompanying drawings in which—

Figure 1 is a side elevation of my improved slicing machine,

Fig. 2 is a top plan view of Fig. 1,

Figure 9:
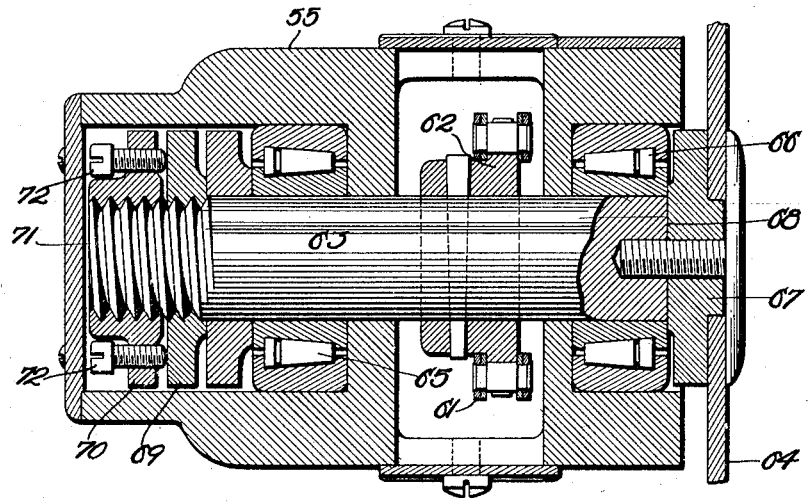
Figure 10:
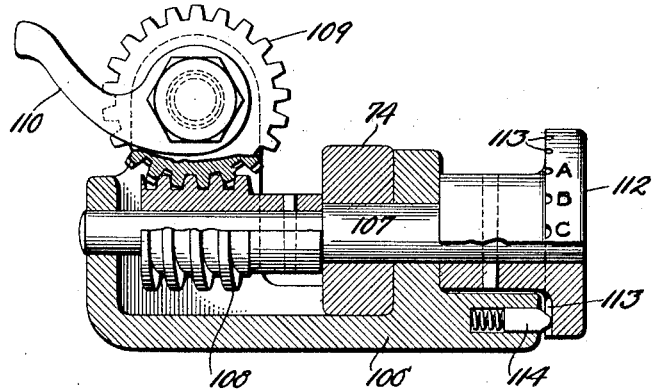
Figure 12:
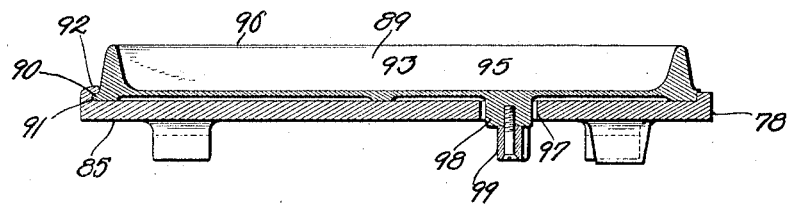
Figure 11:
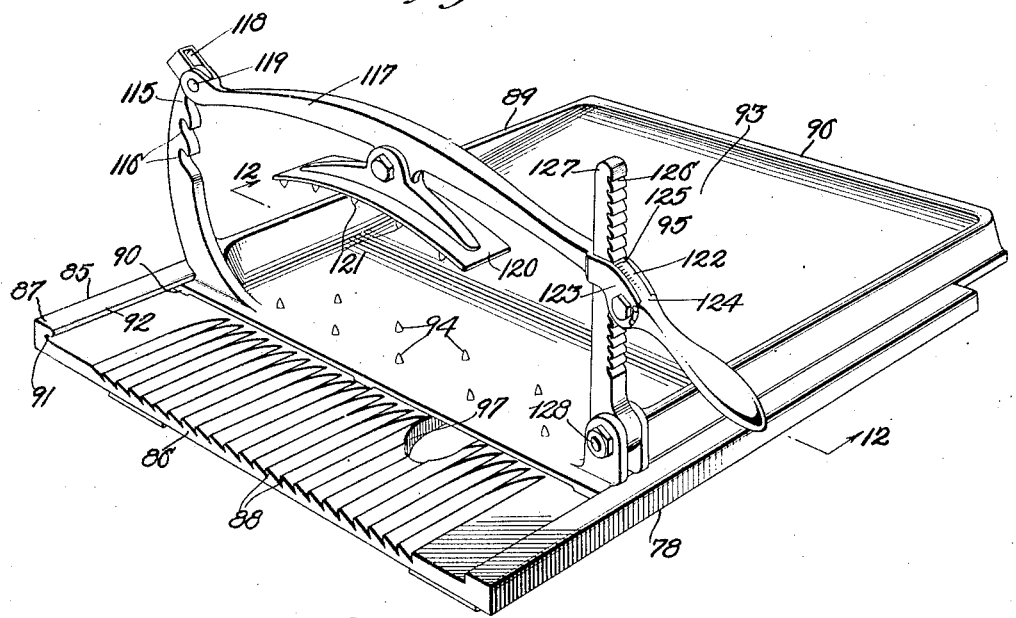
Figure 13:
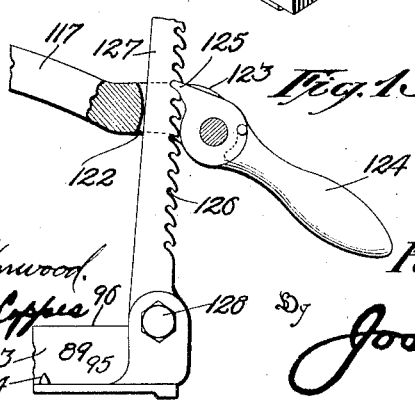
Figure 20:
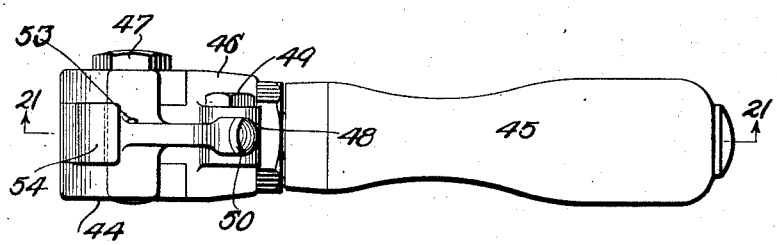
Figure 21:
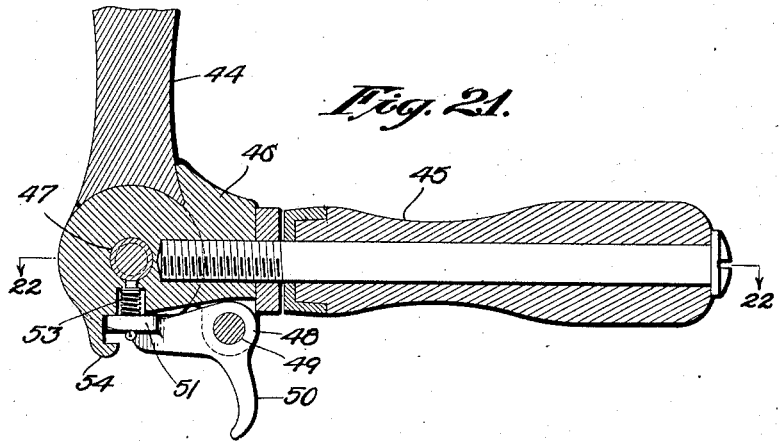
Figure 22:
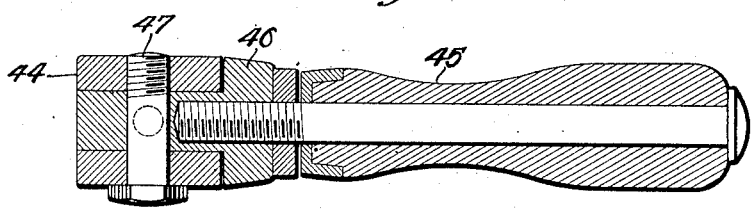

Fig. 3 is a front end elevation of my improved machine and drawn on a larger scale than shown in Figs. 1 and 2, Fig. 4 is an inverted plan view of my improved machine drawn on the same scale as Fig. 3, Fig. 5 is a transverse sectional elevation taken on the line 5—5 of Fig. 1, and drawn on the same scale as Figs. 3 and 4, Fig. 6 is a transverse sectional elevation taken on the line 6—6 of Fig. 1, Fig. 7 is a fragmentary section taken on the line 7—7 of Fig. 1; the receiving and inspection tray and table not being shown, Fig. 8 is a fragmentary inverted sectional plan view taken on the line 8—8 of Fig. 3, Fig. 9 is an enlarged sectional plan view taken on the line 9—9 of Fig. 1, Fig. 10 is a fragmentary section drawn on an enlarged scale and taken on the line 10—10 of Fig. 3, Fig. 11 is a perspective view of certain of the elements of my invention, Fig. 12 is a section taken on the line 12—12 of Fig. 11, Fig. 13 is a fragmentary section taken on the line 13—13 of Fig. 2, Fig. 14 is a side elevation of a portion of my improved machine showing certain of the parts moved into a different position from that which they occupy in Fig. 1, Fig. 15 is a fragmentary section taken on the line 15—15 of Fig. 3, Fig. 16 is a section taken on the line 16—16 of Fig. 15, Fig. 17 is a fragmentary section taken on the line 17—17 of Fig. 2, Fig. 18 is a fragmentary section taken on the line 18—18 of Fig. 1, Fig. 19 is a detached perspective view of certain of the elements shown in Fig. 18, Fig. 20 is an inverted plan view of the operating handle, Fig. 21 is a section taken on the line 21—21 of Fig. 20, Fig. 22 is a section taken on the line 22—22 of Fig. 21, Fig. 23 is an enlarged fragmentary elevation of certain of the parts of my invention, Fig. 24 is an end elevation of Fig. 23, Fig. 25 is a section taken on the line 25—25 of Fig. 23, and Fig. 26 is a fragmentary elevation showing the operating handle swung into an inoperative position.

Referring to the drawings, 30 is a hollow metallic base which is open at its bottom and includes a substantially cylindrical portion 31 and an elongated extension 32. A supporting bracket or spider 33 (see Fig. 4) has arms 34 which are secured to the inner surface of the cylindrical portion 31 of the base 30 and other arms 35 which are secured to the inner portion of the extension 32 of the base 30. The bracket 33 has a head 36. An operating shaft 37 extends through the base 30 from end to end and has its opposite end portions rotatably supported in the opposite ends of said base. The shaft 37 passes through and also has a bearing in the head 36 of the bracket 33 (see Figs. 4 and 5). The upper portion of the head 36 provides a step-bearing for a shaft 38, said shaft extending through a removable section or top 39ª of the cylindrical portion 31 of the base 30. The upper end of the shaft 38 has a toothed pinion or gear wheel 39 secured thereto for a purpose hereinafter described. A bevel gear 40 is rotatable on the shaft 38 and has secured to it a fly wheel 41, said fly wheel being free to rotate in the upper part of the cylindrical portion 31 of the base 30. The bevel gear 40 meshes with a bevel gear 42 on the operating shaft 37 so that when said shaft 37 is rotated the fly wheel 41 and pinion 39 will be rotated.

The top 39ª is detachably connected to the bottom part of the cylindrical portion 31 by screws 43 and can be removed to either insert or permit access to the fly wheel 41.

A handle lever 44 is secured to the operating shaft 37 at a position outside of the base 30 and has a handle 45 which includes a section 46 which is pivotally connected to the handle lever 44 as shown at 47. The section 46 has a latch 48 pivotally connected thereto at 49 and is provided with a finger engaging extension 50. The latch 48 has a lip 51 adapted to enter a notch 52 in the handle lever 44. A tension spring 53 is positioned within the section 46 and is secured to the lip 51 and acts to hold the lip 51 in engagement with the notch 52 when the handle is in its operative position as shown in Figs. 1, 20, 21 and 22. However, by moving the finger engaging extension 50 against the action of the spring 53 the lip 51 will be withdrawn from the notch 52 and the handle 45 can be swung into a position in alinement with the handle lever 44, such for example as shown in Fig. 26. By this construction when the handle is not in use it will not project to any great extent beyond the machine and therefore, will not be in the road of a salesman when the machine is set upon a counter. The section 46 of the handle is provided with a lug 54 which forms a stop for limiting the downward movement of the lip 51. By this arrangement it is impossible to injure the spring 53 and the handle can be quickly swung into an operative or inoperative position.

A hollow casing 55 is secured to the side of the base 30 and includes a detachable plate 56, the removal of which will permit access to the interior of the casing. A shaft 57 has a bearing in the side 58 of the base 30 and also an end bearing in the head 36 of the bracket 33 (see Fig. 5). A bevel gear 59 is secured to the shaft 57 and meshes with the bevel gear 42. A sprocket wheel 60 is secured to the shaft 57 within the bottom of the casing 55 and is connected by a driving chain 61 to a sprocket 62 in the upper part of the casing 55. The sprocket 62 is secured to a shaft 63 having its bearing in the top of the casing 55. One end of said shaft 63 has a circular knife 64 secured thereto on the outside of said casing and above the top 39ª of the base 30. The shaft 63 is mounted in roller bearings 65 and 66 as clearly shown in Fig. 9 and a thrust disk 67 is interposed between the end 68 of the shaft 63 and the knife 64. Two nuts 69 and 70 are secured upon the threaded end 71 of the shaft 63, said nut 69 preferably being circular. The nut 70 has two screws 72 fitting tapped holes therein and said screws 72 are adapted to engage the nut 69 and thereby tend to separate the nuts 69 and 70. This action of the screws 72 forms a positive lock for the nuts 69 and 70 and prevents the shaft 63 from working loose or moving longitudinally. By this construction, the knife 64 is prevented from moving out of its proper path during its rotation, since it is obvious that when the operating shaft 37 is rotated the knife 64 will be rotated due to the connection of the shafts 57 and 63 by the driving chain 61.

By providing the fly wheel 41 in the manner above described an even and powerful movement will be imparted to the knife 64 and the thrust of the fly wheel will be imparted to and taken up by the head 36 of the bracket 33.

Two supporting brackets 73 and 74 are mounted on the top of the base 30 at opposite ends of the machine, each of said brackets having elongated slots 75 through which pass bolts 76 into the top of the base 30. The bolts 76 thus form the securing means for the brackets 73 and 74 to the base 30. The slots 75 are of greater width than the diameter of the bolts 76 so that said brackets 73 and 74 can be swung at a slight angle and secured in their angular positions. The top of the brackets 73 and 74 form sockets or bearings for two guide rods 77. These guide rods are parallel and it will be noted that by swinging or turning the brackets 73 and 74 that the guide rods 77 will extend at an angle or to engage any of the notches 116 within the height of the standard 115. The slot 118 is of such length that it will permit the pin 119 to be withdrawn from any of the notches by moving the pressure lever 117 in the direction of its length. However, when the pressure lever 117 is moved toward the standard 115, the pin 119 will engage any of the notches 116 and move upwardly therein. The pressure lever 117 is provided with a pivoted shoe 120 which has pointed pins 121 depending therefrom. These pins 121 as shown in Fig. 6 are formed integral with the shoe 120 by providing said shoe with notched flanges at the opposite sides. The opposite end of the pressure lever 117 is bifurcated, as shown at 122 and between the furcations 123 is pivotally mounted a handle 124. The handle 124 has a finger 125 adapted to engage any of the notches 126 in a bar 127 which is pivoted at 128 to the side of the secondary carriage 89. The bar 127 extends between the furcations 123 of the lever 117 and when the lever 117 is moved downwardly by the handle 124 it will serve to hold a piece of meat or other material to be sliced between the shoe 120 and the upper surfaces of the primary and secondary carriages. It will thus be observed that the pressure lever 117 can be moved into various positions and supported by the standard 115 and the bar 127 so as to accommodate pieces of meat or other material of different thicknesses. For example if a large ham is to be sliced, the pressure lever 117 can be either raised or entirely removed so as to facilitate the placing of the ham upon the serrations 88 and pointed pins 94, and afterward can be pressed downwardly so as to firmly clamp the ham between the shoe 120 and the primary and secondary carriages. The meat to be sliced can be slid down the incline of the secondary carriage toward the edge 86 of the primary carriage 78 and then moved between the pins 94 and 121 so that the latter will pierce the meat and prevent it from sliding while being sliced. However, the serrations 88 will permit the meat to slide thereover in the direction of movement of the secondary carriage. By having the serrations 88 undercut as above described they will serve to cause the meat to resist the cutting action of the knife or in other words will prevent the portion of the meat immediately adjacent the edge 86 from moving relatively to the primary carriage in the direction of the length thereof; it being obvious that the undercutting of the serrations will form a series of pockets in which the lower portion of the meat will become embedded.

A frame 129 has an eyelet 130 secured thereto and provided with notches 131 in its bottom. A boss 132 on the casing 55 has a central hole 133 adapted to register with a hole 134 in the eyelet 130. Lips 135 on the upper surface of said boss 132 are adapted to fit within the notches 131 of the eyelet 130 (see Figs. 1, 18 and 19). A pivot bolt 136 extends freely through the hole 134 of the eyelet 130 and screws within the hole 133 in the boss 132. A coiled spring 137 is interposed between the top of the eyelet 130 and the head 138 of the bolt 136. By this construction, the frame 129 can be swung in a substantially horizontal plane from the position immediately below the knife 64 and edge 86 of the primary carriage 78 outwardly from the base 30. A tray 139 is mounted in the frame 129 and is preferably made of porcelain or white enameled metal. The frame 129 and tray 139 jointly form a table to receive the slices of meat as they are cut due to the movement of the primary carriage 78 relatively to the knife 64. A plate 140 is secured to the upper side surface of the casing 55 and serves as a guard for the knife and also as a deflector to cause the slices of meat to fall upon the tray 139 when the latter is in its position, as shown in Fig. 1. Thus a salesman can swing the tray 139 away from the base 30 to show the meat to a customer. When the frame and tray are swung, as above described the frame will be slightly raised to permit the notches 131 of the eyelet 130 to free themselves of the lips 135 of the boss 132 and the spring 137 will be compressed to permit this action. However, when the frame and tray are returned to their normal position the lips 135 will again engage the notches 131 and thereby prevent accidental swinging movement of the frame and tray.

The extension 32 of the base 30 has a depression 141, as clearly shown in Figs. 1 and 6 to provide a mounting for a roll of paper 142. This roll of paper is rotatably supported on a spindle 143 having its ends detachably connected in the opposite end portions of the depression 141, such as shown at 144 in Fig. 7 so that said roll of paper can be freely inserted or removed. A cutting or tearing knife 145 is provided for the roll of paper 142, said knife including arms 146 which are pivoted at 147 to the opposite ends of the depression 141.

An arcuate knife guard 148 is substantially U-shape in cross section and has a slot 149 into which the cutting edge 64ª of the knife 64 extends. This guard 148 has arms 150 which are connected to an arcuate plate 151 provided with a slot 152 (see Fig. 2) through which securing screws 153 extend, said securing screws being screwed into the top of the casing 55. The top of the casing 55 to which the plate 151 is secured is circular, as shown in Fig. 1.

The lower portion of the guard 148 has a lug 154, and a thumb screw 155 extends slant to the knife 64, such for example as shown in Fig. 2. In other words, the brackets 73 and 74 provide an adjustable bearing or support for the guide rods 77. A primary carriage 78 is slidably mounted on the guide rods 77 and is pivotally connected at its bottom to one end of a connecting rod 79, as shown at 80. The opposite end of the connecting rod 79 is pivotally connected at 81 to a crank 82. This crank is connected to a gear wheel 83, said gear wheel being in mesh with the pinion 39 and rotatably supported on a stud 84 on the top 39ª of the base 30, as clearly shown in Figs. 2 and 17. Thus it will be noted that when the pinion 39 is rotated the gear wheel 83 and crank 82 will be rotated to cause the primary carriage to be reciprocated along the guide rods 77. The primary carriage 78 includes a plate 85 having an outer edge 86 which is parallel with the guide rods 77. This edge 86 is positioned to travel in close proximity to the cutting edge of the knife 64 so that as the primary carriage moves forwardly the forward portion 87 of said edge will move at an angle away from the knife 64 for a purpose hereinafter more fully described. The upper surface of the plate 85 is serrated or provided with teeth, as shown at 88, the serrations or teeth extending transversely to the path of movement of the primary carriage. These serrations or teeth are undercut at their forward edges so as to firmly hold the bottom of a piece of meat or the like which is placed upon said carriage and as it is moved forwardly to engage the knife 64. The primary carriage 78 has a secondary carriage 89 slidably mounted thereon, said secondary carriage having a portion 90 extending within a groove 91 formed by an over-hung flange 92 on the primary carriage. Thus the secondary carriage 89 is free to slide on the primary carriage transversely of the length of the guide rods 77. The secondary carriage 89 has its upper surface 93 provided with pointed pins 94 and extends upwardly at an incline transversely of its length as shown at 95. In other words, the surface 93 slants downwardly from its edge portion 96 toward the portion which includes the pointed pins 94, as clearly shown in Figs. 6 and 11. The primary carriage 78 has a slot 97 through which depends a portion 98 of the secondary carriage 89. The portion 98 has a toothed rack 99 thereon which extends below the level of the bottom of the primary carriage 78. The lower surface of the primary carriage 78 has a gear wheel 100 thereon which meshes with the teeth of the rack 99. A ratchet wheel 101 is secured to the gear wheel 100 and is adapted to be engaged by a pawl 102 which is pivotally mounted on a lever 103 (see Figs. 3, 6 and 8). The lever 103 is pivotally mounted on a stud 104 which forms the support for the gear wheel 100 and ratchet 101. A spring 105 is connected to the pawl 102 and to the lever 103 so that said pawl is kept in mesh with the teeth of said ratchet 101. The bracket 74 forms a support for a bearing block 106 in which is rotatably mounted a shaft 107. The shaft 107 has a worm 108 thereon which meshes with a worm wheel 109 which is also rotatably supported by the spring block 106. A stop arm 110 is connected to the worm wheel 109 and is adapted to be engaged by the end 111 of the lever 103 when the primary carriage is moving in the direction of the arrow $x$ shown in Figs. 1, 2 and 8. The shaft 107 has a knob 112 secured to one end so that by turning the knob 112 the stop arm 110 will be moved into various positions through the medium of the worm wheel 109, worm 108 and shaft 107. When the end 111 of the lever 103 engages the stop arm 110, for example as shown in Fig. 8 a continued movement of the primary carriage 78 in the direction of the arrow $x$ will cause the gear wheel 100 to be partially rotated and in doing so will cause the secondary carriage 89 to move toward the edge 86 of the primary carriage. A spring 103ª is provided to move the lever 103 back to its normal position against a stop 104ª.

By varying the position of the stop arm 110, by turning the knob 112, the lever 103 will be caused to engage said stop arm 110 at different positions within the distance of its travel and thus the distance which the gear wheel 100 will be turned can be varied and the extent of movement of the secondary carriage upon the primary carriage can also be varied. This action will cause slices of various thicknesses to be cut by the knife 64 and therefore the thickness of the slice can be determined by the adjustment of the stop arm 110. In order to provide a gage whereby the salesman can determine the thickness of the slice before the machine is operated, I provide a knob with a number of recesses or notches 113 and provide the bearing block 106 with a spring-pressed pin 114. This pin is adapted to enter any of the recesses 113 and if desired the recesses may be marked, such for example as by the letters A, B, C, etc., as shown in Fig. 10. Thus a salesman by turning the knob 112 until a predetermined lettered recess is engaged by the spring-pressed pinion 114 can set the stop arm 110 to cut slices of the desired thickness.

The secondary carriage 89 has a curved post or standard 115, the inner surface of which is provided with upwardly extending notches 116. A pressure lever 117 has a slot 118 in one end through which the standard 115 is adapted to extend. A pin 119 extends through the slot 118 and is adapted through a notch 156 in the lug 154, as clearly shown in Figs. 1, and 23. Thus by loosening the screws 153 and thumb screw 155, the guard 148 can be swung on the top of the casing 155 from the position shown in Fig. 1 into the position shown in Fig. 14. When the guard 148 is swung into the position shown in Fig. 14 a sharpening or grinding wheel 157 can be swung from the position shown in Fig. 1 into the position shown in Fig. 14 to grind or sharpen the knife 64. The wheel 157 can be made of emery or any sharpening material and when swung into the position shown in Fig. 14 the knife 64 can be rotated by turning the handle 45 to cause all parts of the cutting edge to be sharpened. It will be noted also that the guard 148 being moved as above described will prevent any parts of the grinding wheel from flying over the machine or into the face of the operator since a hood is provided by the guard 148 which will stop any parts from flying, as above noted.

The grinding wheel 157 as clearly shown in Figs. 1, 14, 23, 24 and 25 is rotatably supported on an arm 158. The grinding wheel 157 is made in two sections 159 and 160, the section 160 is adapted to grind the bevel edge surface 161 of the knife 64 while the section 159 is adapted to grind any fin which is produced on the flat surface of the knife 64. The arm 158 is pivotally mounted on a rod 162 which is secured in a forked bracket 163. A spring 164 is interposed between the arm 158, at the pivot 162, and the portion 165 of the forked bracket 163. A thumb screw 166 fits a tapped opening in the forked bracket 163 and is rotatably connected to the arm 158. Thus the arm 158 can be moved bodily in one direction by turning the thumb screw 166 and can be moved in an opposite direction by the spring 164 when the screw 166 is turned in the reverse direction. The forked bracket 163 can be clamped in either of the positions shown in Figs. 1 and 14 by means of a clamping screw 167.

By having the supporting brackets 73 and 74 adjustable as above described the material to be sliced will be presented to the forward edge of the slicing knife 64 and will immediately move at an angle away from the body portion of the knife 64; thus preventing the uncut portion of the material from dragging against the knife as it passes rearwardly. Thus friction which would otherwise take place between said material and the side surface of the knife is avoided and the knife is relieved of any straining or pushing action against its side. Furthermore, it requires but little power to be applied to the operating handle 45 to cut the material. This feature alone renders my machine of particular advantage for cutting such meat as dried beef which is very compact and hard and it may be stated that such material can be easily cut by my machine without in any manner injuring the parts thereof.

Also by having the tray 139 removably attached to the frame 129 the tray can be easily lifted from the frame for cleansing purposes and so that the entire frame can be cleaned both outside and inside when the tray 139 is removed.

Furthermore, by having the secondary carriage 89 provided with a portion 90 extending within the groove 91, said secondary carriage can be freely lifted from the primary carriage by raising its forward edge and at the same time the toothed rack 99 will be withdrawn from the gear wheel 100 and can be moved into any position desired or can be readily cleaned.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A slicing machine including a hollow base; a slicing knife; a carriage for supporting material to be sliced; means within said base forming a supporting structure; an upright shaft having its lower end supported by said supporting structure; a fly wheel in said base rotatable around said shaft; an operating shaft; a gear wheel connected to said fly wheel; a gear wheel on said upright shaft in mesh with said first gear wheel; a pinion on said first shaft located outside of said base; means operatively connecting said pinion with said carriage, whereby said carriage is actuated to cause the material to be moved into and out of engagement with said knife; and means for operatively connecting said knife with said operating shaft; substantially as described.

2. A slicing machine including a hollow base; a slicing knife; a carriage for supporting material to be sliced; means within said base forming a supporting structure; an upright shaft having its lower end supported by said supporting structure; a fly wheel in said base rotatable around said shaft; an operating shaft; a gear wheel connected to said fly wheel; a gear wheel on said upright shaft in mesh with said first gear wheel; a pinion on said first shaft located outside of said base; means operatively connecting said pinion with said carriage, whereby said carriage is actuated to cause the material to be moved into and out of engagement with said knife; a third shaft; a gear wheel on said third shaft and in mesh with said second mentioned gear wheel; and means operatively connecting said third shaft with said knife; substantially as described.

3. A slicing machine including a hollow base; a slicing knife; a carriage for supporting material to be sliced; means within said base forming a supporting structure; an upright shaft having its lower end supported by said supporting structure; a fly wheel in said base rotatable around said shaft; an operating shaft; a gear wheel connected to said fly wheel; a gear wheel on said upright shaft in mesh with said first gear wheel; a pinion on said first shaft located outside of said base; means operatively connecting said pinion with said carriage, whereby said carriage is actuated to cause the material to be moved into and out of engagement with said knife; a third shaft; a gear wheel on said third shaft and in mesh with said second mentioned gear wheel; a casing secured to said base and into which said third shaft extends; a fourth shaft supported in said casing and to which said knife is connected; and means operatively connected to said third and fourth shafts within said casing; substantially as described.

4. A slicing machine including a base; a slicing knife; supporting means adjustably secured to said base; guiding means on said supporting means; a carriage mounted on said guiding means; means for moving said carriage on said guiding means so as to carry the material, to be sliced, into and out of engagement with said knife; said supporting means, due to its adjustment, being operative to cause said carriage to be moved at an incline to the face of said knife, whereby the material after being presented to the edge of the knife is moved away from the face of said knife; substantially as described.

5. A slicing machine including a base; a slicing knife; supporting brackets having slots therein; bolts extending through said slots into said base, whereby the brackets can be adjustably secured to said base; guiding rods supported by said brackets; a carriage slidable on said guiding rods; and means for actuating said carriage so as to convey material to said knife to be sliced thereby; substantially as described.

6. A slicing machine including a slicing knife; a carriage; and adjustable means for moving said carriage at various angles to the face of said knife to convey material, to be sliced, to the edge of said knife and then away from the face of said knife; substantially as described.

7. A slicing machine including a hollow base; a slicing knife; a carriage for supporting material to be sliced; means within said base forming a supporting structure; an upright shaft having its lower end supported by said supporting structure; a fly wheel in said base rotatable around said shaft; an operating shaft; a gear wheel connected to said fly wheel; a gear wheel on said upright shaft in mesh with said first gear wheel; said base including a removable top through which said upright shaft extends; and means located above said top for operatively connecting said shaft with the carriage; substantially as described.

8. A slicing machine including a slicing knife; a guard for the cutting edge of said knife; a supporting structure; and means for adjustably securing said guard to the supporting structure, whereby said guard can be moved circumferentially into various positions relatively to said cutting edge of the knife; substantially as described.

9. A slicing machine including a circular slicing knife; an arcuate guard for the cutting edge of said knife; a supporting structure; and means for adjustably securing said guard to said supporting structure, whereby the guard can be swung in a path substantially concentric to the axis of said knife; substantially as described.

10. A slicing machine including slicing means; a carriage for supporting material to be sliced; means for moving said carriage, whereby said material is presented to the slicing means; and a table pivotally mounted below the path of movement of the carriage and adapted to receive the sliced material, said table being capable of being swung in a substantially horizontal plane into a position away from the slicing means to permit inspection of the sliced material; substantially as described.

11. A slicing machine including slicing means; a carriage for supporting material to be sliced; means for moving said carriage, whereby said material is presented to the slicing means; and a table pivotally mounted below the path of movement of the carriage and adapted to receive the sliced material, said table being capable of being swung in a substantially horizontal plane into a position away from the slicing means to permit inspection of the sliced material, said table comprising a frame and a removable tray; substantially as described.

12. A slicing machine including slicing means; a carriage for supporting material to be sliced; means for moving said carriage, whereby said material is presented to the slicing means; a table pivotally mounted below the path of movement of the carriage and adapted to receive the sliced material, said table being capable of being swung in a substantially horizontal plane into a position away from the slicing means to permit inspection of the sliced material; and means for holding said table in its normal position and in said swung position, whereby the table will not swing accidentally; substantially as described.

13. A slicing machine including a slicing knife; a carriage; means for moving said carriage relatively to said knife, said carriage having serrations which are undercut in a direction facing said knife, whereby material mounted on said carriage will be forced into the undercut portions of said serrations when the carriage is actuated to move said material to the knife; substantially as described.

14. A slicing machine including a slicing knife; a primary carriage; means for moving the primary carriage toward and from said knife; a secondary carriage on said primary carriage; and means for clamping material to be sliced, to said secondary carriage, said secondary carriage having an upper surface slanting toward a plane including the cutting edge of said knife; substantially as described.

15. A slicing machine including a supporting structure; a slicing knife; a primary carriage having an edge portion movable adjacent the slicing knife; a secondary carriage mounted on the primary carriage and having a toothed rack; a gear wheel on the primary carriage and meshing with said rack; a ratchet operatively connected to said wheel; a pivotally supported lever carried by said primary carriage; a pawl on said lever for engagement with said ratchet; and a stop on said supporting structure positioned to be engaged by said lever during the movement of the primary carriage, whereby the ratchet is partially rotated and the secondary carriage is moved toward a plane including the cutting edge of said knife; substantially as described.

16. A slicing machine including a supporting structure; a slicing knife; a primary carriage having an edge portion movable adjacent the slicing knife; a secondary carriage mounted on the primary carriage and having a toothed rack; a gear wheel on the primary carriage and meshing with said rack; a ratchet operatively connected to said wheel; a pivotally supported lever carried by said primary carriage; a pawl on said lever for engagement with said ratchet; and an adjustable stop on said supporting structure positioned to be engaged by said lever during the movement of the primary carriage, whereby the ratchet is partially rotated and the secondary carriage is moved toward a plane including the cutting edge of said knife; substantially as described.

17. A slicing machine including a supporting structure; a slicing knife; a primary carriage having an edge portion movable adjacent the slicing knife; a secondary carriage mounted on the primary carriage; means operative to move said secondary carriage toward a plane including the edge of said knife when a portion of said means is stopped during the movement of the primary carriage; a stop arm; a worm wheel connected to said stop arm; a shaft; a worm on said shaft meshing with said worm wheel; and means for turning said shaft to move said stop arm into various positions to stop said portion of said first means and thereby cause said movement of the secondary carriage; substantially as described.

18. A slicing machine including a supporting structure; a slicing knife; a primary carriage having an edge portion movable adjacent the slicing knife; a secondary carriage mounted on the primary carriage; means operative to move said secondary carriage toward a plane including the edge of said knife when a portion of said means is stopped during the movement of the primary carriage; a stop arm; a worm wheel connected to said stop arm; a shaft; a worm on said shaft meshing with said worm wheel; means for turning said shaft to move said stop arm into various positions to stop said portion of said first means and thereby cause said movement of the secondary carriage, said latter means having notches therein; and a spring pressed pin for engaging said notches whereby the extent of movement of said lever means can be determined; substantially as described.

In testimony whereof I have signed my name to this specification in the presence of two subscribing witnesses.

RAYMOND S. C. FOW.

Witnesses:
MARY A. INGLAR,
CHAS. E. POTTS.